United States Patent [19]

Ricks

[11] Patent Number: 5,585,606
[45] Date of Patent: Dec. 17, 1996

[54] READILY RUPTURABLE MEMBRANE SWITCH FOR AIRBAG MODULE

[75] Inventor: Merle K. Ricks, Layton, Utah

[73] Assignee: Morton International, Inc., Chicago, Ill.

[21] Appl. No.: 418,831

[22] Filed: Apr. 7, 1995

[51] Int. Cl.⁶ .................................................. B60R 21/22
[52] U.S. Cl. ............................ 200/61.08; 200/61.54; 280/735; 307/10.1
[58] Field of Search ....................... 307/10.1; 180/274; 200/86 R, 85 R, 61.54, 51.58 R, 61.08; 280/728.1, 731, 734, 735, 750; 340/436, 665–667; 74/484 R, 484 H

[56] References Cited

U.S. PATENT DOCUMENTS

| | | | |
|---|---|---|---|
| 4,314,114 | 2/1982 | Larson | 200/5 A |
| 4,612,425 | 9/1986 | Kanai et al. | 200/61.55 |
| 4,714,806 | 12/1987 | Inui et al. | 200/61.55 |
| 4,720,610 | 1/1988 | MacHarrie | 200/5 A |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,085,462 | 2/1992 | Gualtier | 280/731 |
| 5,186,490 | 2/1993 | Adams et al. | 280/731 |
| 5,198,629 | 3/1993 | Hayashi et al. | 200/61.54 |
| 5,265,904 | 11/1993 | Shelton et al. | 280/731 |
| 5,265,905 | 11/1993 | Shelton | 280/731 |
| 5,283,404 | 2/1994 | Prescaro, Jr. | 200/61.54 |
| 5,369,232 | 11/1994 | Leonelli | 200/61.54 |
| 5,399,819 | 3/1995 | Lang | 200/61.54 |
| 5,449,197 | 9/1995 | Kermer | 280/731 |
| 5,465,998 | 11/1995 | Davis | 200/61.54 |

*Primary Examiner*—Gerald P. Tolin
*Attorney, Agent, or Firm*—George W. Rauchfuss, Jr.; Gerald K. White

[57] ABSTRACT

A membrane switch wherein the membranes have rupturable bridge members. The bridge members provide an area that is readily rupturable such that they can be appropriately placed in proximity to or adjacent a tear line such as that used in the cover of an airbag module in a motor vehicle. The membrane switch is suitable for use as horn actuation switch mounted on an airbag cover in a motor vehicle driver side airbag module assembly without unduly restricting deployment of an inflatable airbag from the module assembly.

20 Claims, 3 Drawing Sheets

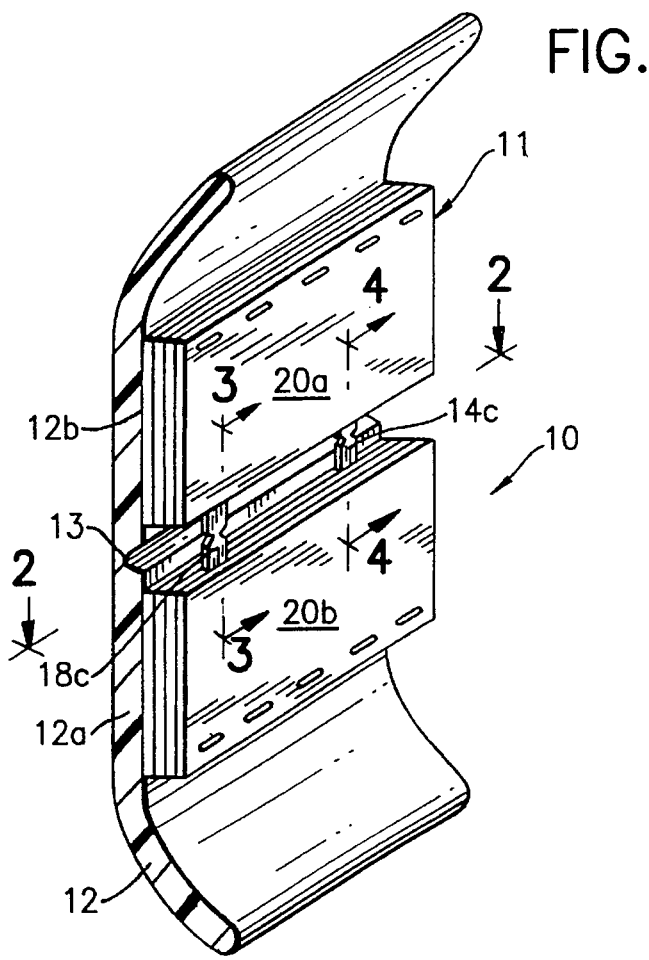
FIG. 1
FIG. 2
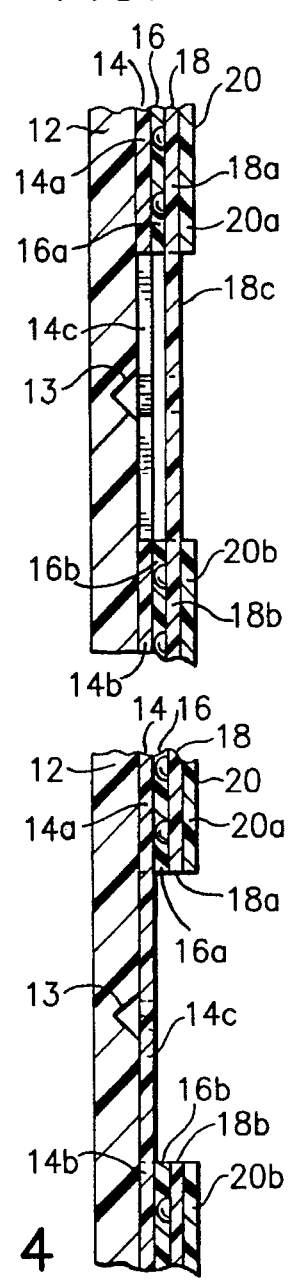
FIG. 3
FIG. 4

READILY RUPTURABLE MEMBRANE SWITCH FOR AIRBAG MODULE

FIELD OF THE INVENTION

The present invention relates to a membrane switch and more particularly to a membrane switch suitable for actuating a horn on the steering wheel of an automobile or other motor vehicle. More specifically the present invention relates to a readily rupturable membrane horn switch for use on the steering column of a motor vehicle having an inflatable type modular occupant restraint system.

BACKGROUND OF THE INVENTION

This invention relates to a driver side airbag membrane horn switch assembly. Driver side airbags are conventionally mounted on steering wheels along with horn actuating switch arrangements. A number of horn actuation switch assemblies have been proposed which suffer disadvantages and actuation inconsistencies when accommodating the tear lines in an airbag module cover. In such an airbag restraint system the airbag is forced out of the module in a predetermined manner through weakened areas or tear lines in the airbag cover or door. In order to accommodate and not interfere with the operation of weakened areas or tear lines in an airbag cover during deployment of the airbag, the membrane horn switch typically has been placed or located only on one half of the airbag cover or to the side thereof. However, this is not desirable, particularly in the event of an emergency where the vehicle occupant needs to be able to apply pressure to any portion of the airbag cover on the steering wheel in order to immediately actuate the horn. Emergency response time is limited if an emergency or accident is imminent, thereby requiring the provision of a large horn actuation area. If actuation of the horn membrane switch is to be possible over essentially the entire surface area of the airbag cover, the switch needs to be constructed of two separate and distinct sections. The horn switch would then require two separate wiring circuits if both halves of the cover were to be fully sensitive or responsive to actuation pressure on the cover. Otherwise, only part of the airbag door cover would be capable of operating the horn.

It would obviously be desirable to provide the potential for horn actuation over a larger area of the airbag cover without having to provide additional circuitry for both sides of the airbag cover or door. It is also desirable to provide a membrane horn switch that is easily and quickly activated over a significant portion of the airbag cover and yet does not significantly interfere with deployment of the airbag or opening of the cover door at the weakened area or tear line portions.

Accordingly, it is an object of this invention to provide a membrane switch which can provide a large horn actuation area that is easily and quickly actuated. It is another object of the present invention to provide a membrane switch which requires only a single wiring circuit to actuate the switch assembly. It is a still further object of the present invention to provide a membrane switch which permits a large horn actuation area that is quickly and easily actuated yet does not unnecessarily interfere with or prevent deployment of an inflatable airbag through an airbag cover or door having weakened areas or tear lines thereon when the membrane switch is positioned behind the horn actuation area of the airbag cover or door.

BRIEF SUMMARY OF THE INVENTION

Membrane type switches conventionally comprise two very thin membrane sheets having conductive coatings which are separated by thin spacers or dielectric material.

So that the membrane switch of the present invention can be positioned behind the horn actuation area of an airbag module cover, each of the two membrane sheets are configured so that they each have two relatively large areas that are adaptable to be placed behind the horn actuation area of the airbag cover, each membrane sheet also has a relatively small bridging member connecting the two relatively large areas that further adapt the membranes to accommodate the weakened or tear lines of the airbag module cover. The bridging member is small and readily rupturable as the airbag is deployed.

The small bridging member also completes the circuit of the switch so that only one set of wiring is needed to make essentially the entire airbag cover area sensitive to horn actuation.

BRIEF DESCRIPTION OF THE DRAWINGS

The membrane switch of this invention will be illustrated in connection with the accompanying drawings in which:

FIG. 1 is a partial perspective view of an airbag cover with a membrane switch in accordance with this invention;

FIG. 2 illustrates a cross-sectional view of the membrane switch along the lines 2—2 of FIG. 1;

FIG. 3 illustrates an enlarged cross-sectional view of the membrane switch along the lines 3—3 of FIG. 1;

FIG. 4 illustrates an enlarged cross-sectional view of the membrane switch along the lines 4—4 of FIG. 1;

DETAILED DESCRIPTION OF THE INVENTION

Figure 5:
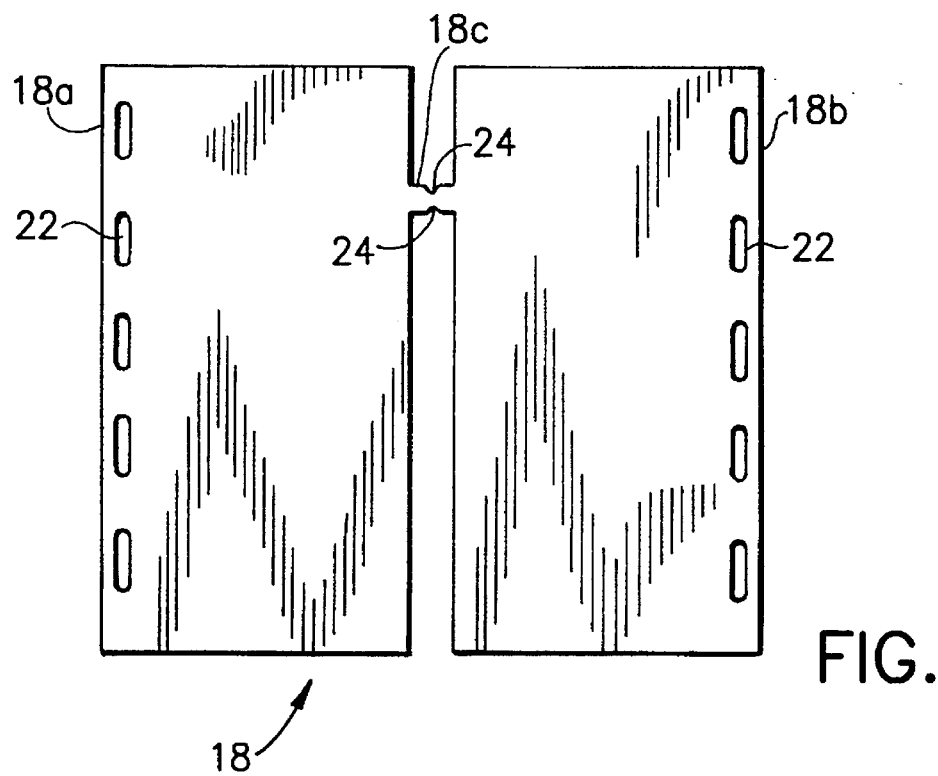
FIG. 5 illustrates a first membrane layer with a notched bridge member.

A membrane horn switch assembly of this mounted on a driver side airbag cover of an airbag module is illustrated in FIGS. 1 to 4. The airbag cover or deployment door - membrane horn switch assembly is indicated generally by reference numeral 10 and comprises a membrane switch 11 mounted on the back or inner side of an airbag cover or deployment door 12, hereinafter referred to as a cover, comprising first and second cover portions 12a and 12b on opposing sides of a tear line or weakened area 13. Upon deployment of an inflatable airbag (not shown) in an airbag module the force of the inflating airbag ruptures tear line 13 and permits the airbag to deploy. Membrane switch 11 is mounted on the rear or inner side of the cover 12 (i.e. on the cover side facing away from the vehicle driver or occupant) by any suitable means such as by heat staking, thermal bonding, cementing or the like.

Figure 6:
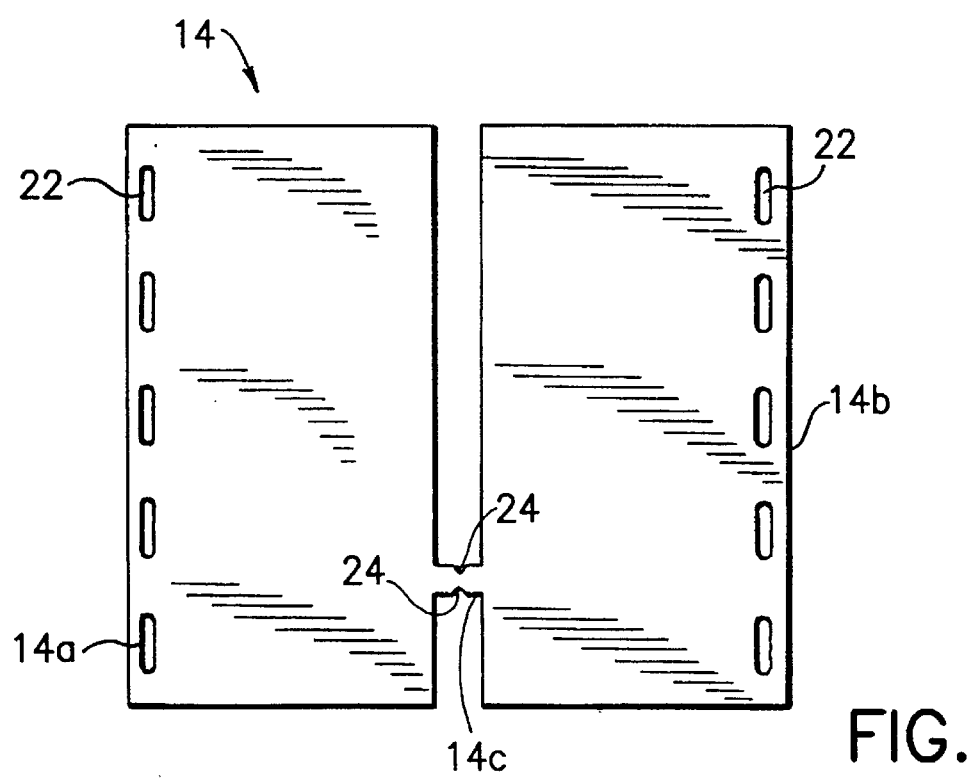
FIG. 6 illustrates a second membrane layer with a notched bridge member.
Figure 7:
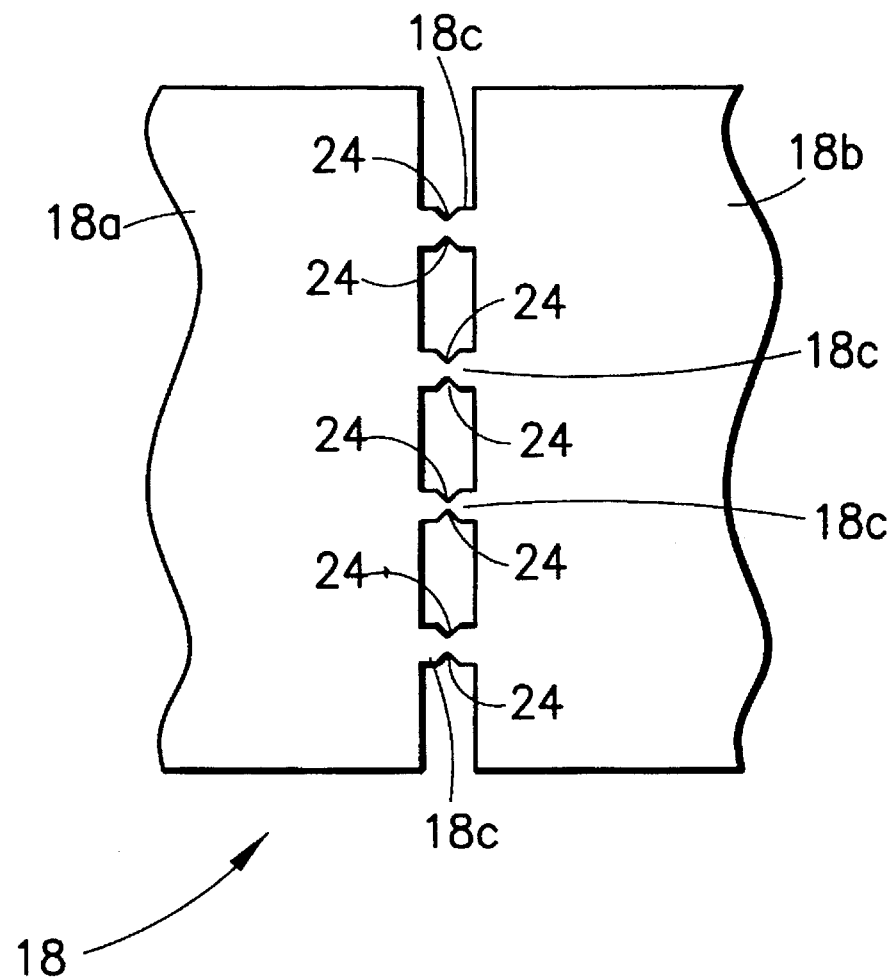
FIG. 7 is a partial plan view illustrating a further embodiment of a membrane layer of a membrane switch of this invention.

Membrane switch 11 comprises two electrically conductive membrane sheets, namely a first membrane sheet 14 and a second membrane sheet 18—see FIGS. 5 and 6. Each membrane sheet 14 and 18 is generally a planar, rectangularly-shaped sheet of thin film, generally of polyethylene or polyester such as a MYLAR polyester, with an electrically conductive coating applied on one side of the sheet. The electrical conductive coating may be applied by any suitable means, such as for example, by screening conductive ink or copper or silver or aluminum thereon. The sheets may be of a thickness of about 0.13 mm for example. Each membrane sheet 14 and 18 comprises two relatively large electrically conductive areas or halves 14a and 14b and 18a and 18b joined together by at least one relatively small electrically conductive area 14c and 18c bridging between the large areas. The bridging areas are generally of the same thickness and of the same material as the large areas. It will be appreciated that although the invention is described with only one relatively small bridging area between the two relatively large halves of each membrane sheet, the invention contemplates that there may be more than one such small bridging areas between the two halves of each membrane sheet. Additional bridging areas provide for increased reliability of operativeness of the horn switch in the event of inadvertent breakage or rupture of one of the bridging areas. Thus, there can be, for example, one, two, three or more small bridging areas between the two relatively large halves of each membrane sheet, as illustrated in FIG. 7. In fact, the bridging areas 14c and 18c form integral, one piece sheets with areas 14a and 14b and 18a and 18b, respectively. The relatively small bridging areas 14c and 18c provide readily rupturable areas for rupture by a force produced by an inflating airbag as will be described hereinafter. The membrane sheets 14 and 18 may be provided with mounting openings 22 along peripheral edges of said sheets for bonding the assembled membrane switch 11 to airbag door 12 such as by use of stakes or may be bonded to the door in any suitable manner such as by heat staking, thermal bonding or by ultrasonic welding or the like.

Generally, the two relatively large areas of each membrane sheet, i.e. areas 14a together with area 14b of sheet 14 and area 18a together with area 18b of sheet 18, will comprise at least a 95% or more, preferably about 98% or more, of the surface area of the sheet and the relatively small bridging area of each sheet, i.e. areas 14c and 18c, will comprise less than 5% and preferably less than about 2% of the surface area of the sheet.

It is to be understood that each of membrane sheets 14 and 18 will be provided with an electrical wire and terminal (not shown) for coupling the membrane sheet to electrical circuitry utilized to actuate a horn which switch 11 is designed to operate upon actuation of said switch.

The two membrane sheets 14 and 18 of FIGS. 6 and 5 respectively are assembled into a membrane switch 11 by superimposing the two sheets, such that relatively large area 14a of sheet 14 and relatively large area 18a of sheet 18 overlay each other as do relatively large areas 14b and 18b with their conductive sides facing each other. One or both of membrane sheets 14 and 18 may be provided with a dielectric coating or spacer 16 in a predetermined suitable pattern so that when the relatively large electrically conductive areas 14a and 14b of sheet 14 are superimposed over respective corresponding large areas 18a and 18b of sheet 18, the dielectric coating or spacers 16a and 16b prevent closing of the switch 11 and completion of the actuation circuit until sufficient actuation pressure is exerted onto the airbag cover 12 to cause the electrically conductive membrane sheets 14 and 18 to contact each other. The thickness and shape of the dielectric coating or spacer 16 can be varied to alter the sensitivity of the actuation switch.

The bridging elements 14c and 18c of the two membrane sheets 14 and 18 are preferably located so that, when the relatively large electrically conductive areas 14a and 14b and 18a and 18b of each of the two membrane sheets 14 and 18 are superimposed over each other, bridge areas 14c and 18c are not superimposed or overlay each other but are instead spaced laterally apart from each other such that they bridge across the switch at different locations along the tear line 13 of cover 12 when the assembled switch 11 is mounted on the rear side of the cover. Of course, it will be appreciated that the bridge areas 14C and 18C may, if desired, also be superimposed with a dielectric layer sandwiched between the two bridge area layers.

In a preferred embodiment of this invention, rigid backing plates or sheets 20a and 20b may be employed to the rear of the membrane sheets 14 and 18 to provide for easier actuation of the assembled membrane switch 11. The backing members 20a and 20b are preferably a rigid thermoplastic sheet and more particularly a polycarbonate having a thickness of about 1 mm to provide a stable and rigid pressure surface for actuation of the switch. If such backing plates or sheets are utilized in the switch, the backing plates or sheets can be provided with mounting openings 22 corresponding to the mounting openings on membrane sheets 14 and 18.

In a further embodiment of this invention, the relatively small bridging areas 14c and 18c may be provided with one or more, preferably at least two opposing notches 24, which act to further weaken the thin membrane bridging areas and enhance their ability to rupture during airbag deployment.

The assembled membrane switch 11, preferably with rigid backing members 20a and 2Ob, is mounted against the rear or inner surface of the desired horn actuation area of the airbag deployment door 12 in a manner such that the bridging areas 14c and 18c of membrane sheets 14 and 18 are positioned transversely across tear seam 13 of the deployment door 12. Thus, the horn actuation membrane switch 11 is sandwiched between a thin and flexible deployment door cover 12 and relatively rigid backing members 20a and 20b with the bridging members 14c and 18c transversing tear line 13 of the door cover.

Depression of the airbag deployment door cover 12 by the driver will readily compress membrane switch 11 against the rigid backing layers 20a and 20b causing the conductive faces on membrane sheets 14 and 18 to contact each other to thereby close the circuit and cause a horn (not shown) to which a switch is attached to sound.

Should a situation arise commencing deployment of an airbag, the pressure of the inflating airbag will readily force membrane bridge areas 14c and 18c to rupture and the airbag to then rupture tear line 13 of the deployment door 12 to cause the door to open permitting deployment of the airbag. The thinness and smallness of the bridge areas 14c and 18c, when aligned with the rupturable tear line 13 of the airbag deployment door 12, allows these bridge areas to readily rupture during deployment of an inflatable airbag in an airbag module. Moreover, the notches 24 further weaken the bridge areas 14c and 18c to enhance their ability to rupture during airbag deployment.

It is believed that the many advantages of this invention will now be apparent to those skilled in the art and that a number of variations and modifications may be made therein without departing from its spirit and scope.

What is claimed is:

1. In a membrane switch for use as a horn actuation switch on a driver side airbag cover of an airbag module assembly housed in a vehicle steering column, the improvement comprising:

the membrane switch having first and second electrically conductive membrane sheets said first and second electrically conductive membrane sheets in juxtaposed relationship for electrical contact with actuation pressure on said switch, and wherein each of said first and second electrically conductive membrane sheets comprises first and second relatively large electrically conductive areas integral with and joined together by at least one relatively small electrically conductive area bridging between said first and second relatively large conductive areas, the at least one relatively small electrically conductive area bridging said first and second relatively large electrically conductive areas of each membrane sheet being readily rupturable by a force provided by an inflating airbag in an airbag module assembly and wherein the at least one relatively small electrically conductive bridging area is locatable on an airbag cover in an airbag module assembly in a location generally aligned with and spanning a rupturable or tearable seam in said cover of said airbag module assembly.

2. The membrane switch of claim 1 wherein said first and second membrane sheets are each thin film sheets and are separated from each other by a dielectric spacer means for preventing actuation of the horn switch until sufficient actuation pressure is exerted on the airbag cover of the airbag module assembly.

3. The membrane switch of claim 2 wherein said first and second membrane sheets are each thin film polyester sheets having an electrically conductive coating applied thereon.

4. The membrane switch of claim 1 wherein the first and second relatively large electrically conductive areas of the first membrane sheet are superimposed and coextensive respectively with the first and second relatively large electrically conductive areas of the second membrane sheet and wherein the at least one relatively small electrically conductive bridging area of said first membrane sheet is not superimposed over the at least one relatively small electrically conductive bridging area of said second membrane sheet.

5. The membrane switch of claim 2 wherein the first and second relatively large electrically conductive areas of each membrane sheet are of generally planar rectangular shape and together comprise at least about 98% of said membrane's total area.

6. The membrane switch of claim 2 wherein the first and second relatively large electrically conductive areas of the first membrane sheet are superimposed and coextensive respectively with the first and second relatively large electrically conductive areas of the second membrane sheet and wherein the at least one relatively small electrically conductive bridging area of said first membrane sheet is not superimposed over the at least one relatively small electrically conductive bridging area of said second membrane sheet.

7. The membrane switch of claim 5 wherein the first and second relatively large electrically conductive areas of the first membrane sheet are superimposed and coextensive respectively with the first and second relatively large electrically conductive areas of the second membrane sheet and wherein the at least one relatively small electrically conductive bridging area of said first membrane sheet is not superimposed over the at least one relatively small electrically conductive bridging area of said second membrane sheet.

8. The membrane switch of claim 1 wherein the at least one relatively small bridging area of each membrane sheet has notches to lessen resistance of said bridging areas to rupture by the force provided by the inflating airbag.

9. The membrane switch of claim 4 wherein the at least one relatively small bridging area of each membrane sheet has notches to lessen resistance of said bridging areas to rupture by the force provided by the inflating airbag.

10. The membrane switch of claim 7 wherein the at least one relatively small bridging area of each membrane sheet has notches to lessen resistance of said bridging areas to rupture by the force provided by the inflating airbag.

11. A membrane horn switch assembly comprising first and second membrane sheets, each of said first and second membrane sheets having first and second relatively large electrically conductive areas and at least one relatively small electrically conductive area bridging between and joining said first and second relatively large electrically conductive areas, each of said areas having a conductive layer on a face thereof, said first and second membrane sheets are just a positionally superimposed so that the conductive layer on the relatively large areas of the first membrane sheet faces the conductive layer on the relatively large areas of the second membrane sheet but wherein, in the absence of actuation pressure, the conductive layer on the first membrane sheet is prevented from electrical contact with the conductive layer on the second membrane sheet by dielectric spacer means applied to a portion of at least one of said conductive layers and wherein the at least one relatively small electrically conductive bridging areas are readily rupturable by a force provided by an inflating airbag of an airbag module assembly.

12. A membrane horn switch assembly of claim 11 wherein the at least one relatively small electrically conductive area of said first membrane sheet is spaced laterally apart from the at least one relatively small electrically conductive area of said second membrane sheet so that said relatively small areas are not superimposed.

13. A membrane horn switch assembly of claim 12 wherein said first and second membrane sheets are each thin film layers.

14. A membrane horn switch assembly of claim 13 wherein the first and second membrane sheets are each thin film polyester layers having a conductive layer thereon.

15. A membrane horn switch assembly of claim 11 wherein the first and second relatively large electrically conductive areas of each membrane sheet are of generally planar rectangular shape and together comprise at least about 98% of said membrane's total area.

16. A membrane horn switch assembly of claim 12 wherein the first and second relatively large electrically conductive areas of each membrane sheet are of generally planar rectangular shape and together comprise at least about 98% of said membrane's total area.

17. A membrane horn switch assembly of claim 14 wherein the first and second relatively large electrically conductive areas of each membrane sheet are of generally planar rectangular shape and together comprise at least about 98% of said membrane's total area.

18. A membrane horn switch assembly of claim 11 wherein the at least one relatively small bridging area of each membrane sheet has notches to lessen resistance of said bridging areas to rupture by the force provided by the inflating airbag.

19. A membrane horn switch assembly of claim 15 wherein the at least one relatively small bridging area of each membrane sheet has notches to lessen resistance of said bridging areas to rupture by the force provided by the inflating airbag.

20. A membrane horn switch assembly of claim 17 wherein the at least one relatively small bridging area of each membrane sheet has notches to lessen resistance of said bridging areas to rupture by the force provided by the inflating airbag.

* * * * *